(12) United States Patent  (10) Patent No.: US 8,942,554 B2
Schmidt et al.  (45) Date of Patent: Jan. 27, 2015

(54) 45 DEGREE VIEWING ACCESSORY FOR CAMERA VIEWFINDER

(71) Applicants: Louis J. Schmidt, Hermosa Beach, CA (US); Michael R. Schmidt, Hermosa Beach, CA (US); Robert P. Schmidt, West Hollywood, CA (US)

(72) Inventors: Louis J. Schmidt, Hermosa Beach, CA (US); Michael R. Schmidt, Hermosa Beach, CA (US); Robert P. Schmidt, West Hollywood, CA (US)

(73) Assignee: Hoodman Corporation, Torrance, CA (US)

( * ) Notice: Subject to any disclaimer, the term of this patent is extended or adjusted under 35 U.S.C. 154(b) by 47 days.

(21) Appl. No.: 13/769,958

(22) Filed: Feb. 19, 2013

(65) Prior Publication Data

US 2014/0233933 A1  Aug. 21, 2014

(51) Int. Cl.
*G03B 13/02* (2006.01)
*G03B 13/06* (2006.01)

(52) U.S. Cl.
CPC .............. *G03B 13/02* (2013.01); *G03B 13/06* (2013.01)
USPC ............ 396/382; 396/384; 396/377; 396/378

(58) Field of Classification Search
USPC ................. 396/382, 373, 377–379, 383–386; 348/333.09, 341; 359/643
See application file for complete search history.

(56) References Cited

U.S. PATENT DOCUMENTS 4,279,489 A * 7/1981 Shono et al. ................... 396/384
2010/0303455 A1* 12/2010 Lai .................................. 396/25

* cited by examiner

*Primary Examiner* — Rochelle-Ann J Blackman
(74) *Attorney, Agent, or Firm* — Fildes & Outland, P.C.

(57) ABSTRACT

A camera viewfinder viewer accessory mountable on a camera includes an elongated body portion having first and second ends and a longitudinal axis extending from the first end to the second end. A light-transmitting passageway extends through the body portion from the first end to the second end. A connector is disposed adjacent to the first end. The body portion second end includes an angled face disposed at a generally 45° angle relative to the longitudinal axis. An eyepiece is connected to the body portion second end adjacent the angled face. The eyepiece has a longitudinal axis generally disposed at an angle that is 45 degrees relative to the longitudinal axis of the body portion. A viewfinder image is directed from the camera viewfinder along the longitudinal axis of the body portion, the image is redirected along the longitudinal axis of the eyepiece, to be viewed through the eyepiece.

9 Claims, 3 Drawing Sheets

45 DEGREE VIEWING ACCESSORY FOR CAMERA VIEWFINDER

TECHNICAL FIELD

This invention relates to cameras having a viewfinder, and more particularly to a camera viewfinder viewer accessory.

BACKGROUND OF THE INVENTION

It is known in the art relating to cameras and photography to use a camera's viewfinder, such as an optical viewfinder, to compose a photograph. The viewfinder is typically located on the back side of the camera, so that a photographer must position his or her face up against the back of the camera in order to view an image through the viewfinder. In this position, the photographer's eye is also generally parallel to the line of sight of the camera. In addition, a camera's viewfinder is typically not shielded from ambient light (such as natural sunlight or a manmade light source), and therefore the photographer may be forced to squint in order to see the image in the viewfinder.

SUMMARY OF THE INVENTION

The present invention provides a camera viewfinder viewer accessory that allows a photographer to frame pictures from a position that is spaced back from the camera and that is 45 degrees upward relative to the camera viewfinder. The eyepiece of the viewer accessory is spaced from the camera when the view accessory is mounted on the camera so that a photographer does not have to press his/her face up against the back of the camera to look through the camera's viewfinder. Also, being positioned slightly behind and above the camera makes subject tracking significantly easier, and may allow the photographer to more easily utilize a low or high camera angle. Further, the viewer accessory shields the camera viewfinder from ambient light, providing for additional user comfort when using the camera viewfinder to compose photographs.

More particularly, a camera viewfinder viewer accessory in accordance with the present invention that is mountable on a camera viewfinder includes an elongated body portion having first and second ends and a longitudinal axis extending from the first end to the second end. A light-transmitting passageway extends through the body portion from the first end to the second end. A connector for mounting the body portion to the camera viewfinder is disposed adjacent to the first end. The body portion second end includes an angled face disposed at a generally 45° angle relative to the longitudinal axis. An eyepiece is connected to the body portion adjacent the angled face at the second end of the body portion. The eyepiece has a longitudinal axis generally disposed at an angle that is 45 degrees relative to the longitudinal axis of the body portion. A viewfinder image is directed from the camera viewfinder along the longitudinal axis of the body portion, the image is redirected along the longitudinal axis of the eyepiece, to be viewed through the eyepiece.

In one embodiment, a plurality of cooperative objective lenses may be mounted within the light-transmitting passageway of the body portion. The eyepiece may include at least one eyepiece lens. A prism may be mounted within the light-transmitting passageway of the body portion to redirect light from the longitudinal axis of the body portion to the at least one eyepiece lens of the eyepiece. The at least one eyepiece lens may provide optical magnification of the image viewed through the viewer accessory. The eyepiece may include an eyecup that extends away from the body portion.

The connector may be an assembly that is releasably securable to the camera viewfinder.

The eyepiece also may include a diopter adjustment.

These and other features and advantages of the invention will be more fully understood from the following detailed description of the invention taken together with the accompanying drawings.

DETAILED DESCRIPTION OF THE INVENTION

Figure 1:
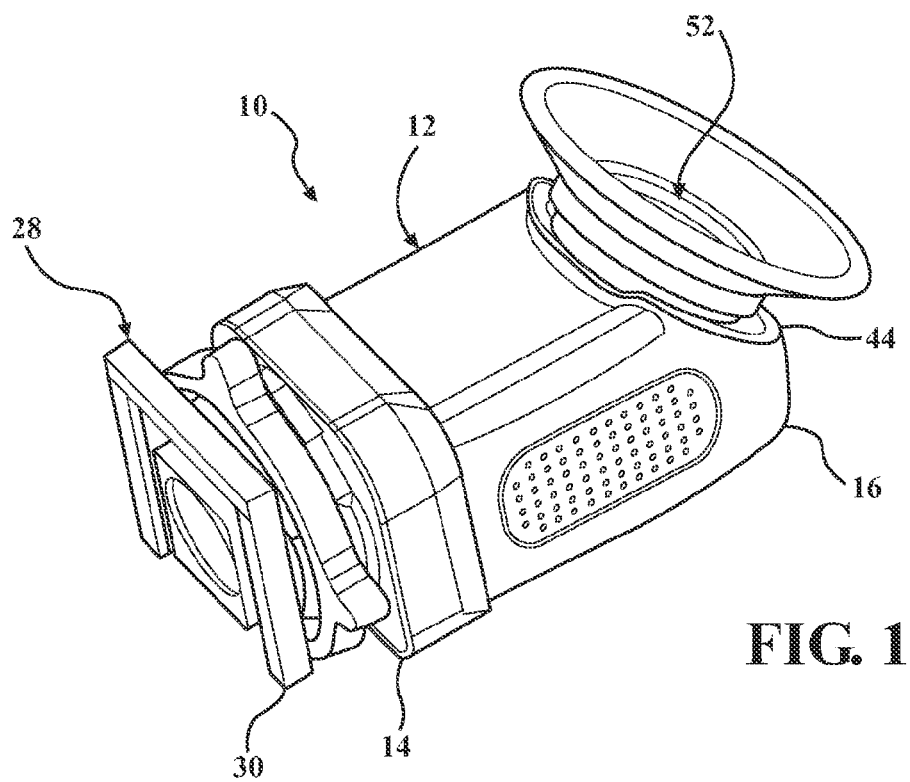
FIG. 1 is a perspective view of a camera viewfinder viewer accessory in accordance with the present invention.

Referring now to the drawings in detail, numeral 10 generally indicates a camera viewfinder viewer accessory that is mountable on a camera viewfinder. The viewer accessory 10 allows a photographer to compose a photograph from a position that is spaced behind the camera and at an angle that is 45 degrees upward from the camera viewfinder. The viewer accessory 10 also provides a more comfortable position for the photographer to view the camera viewfinder, and facilitates subject tracking when using the camera to photograph moving objects.

Figure 2:
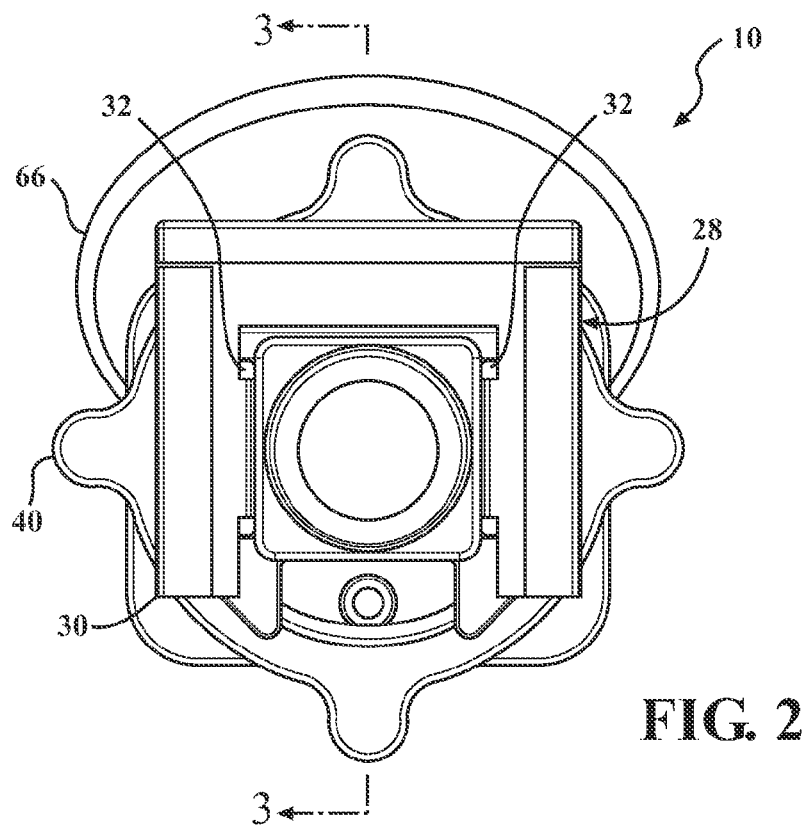
FIG. 2 is a rear view of the camera viewfinder viewer accessory.
Figure 3:
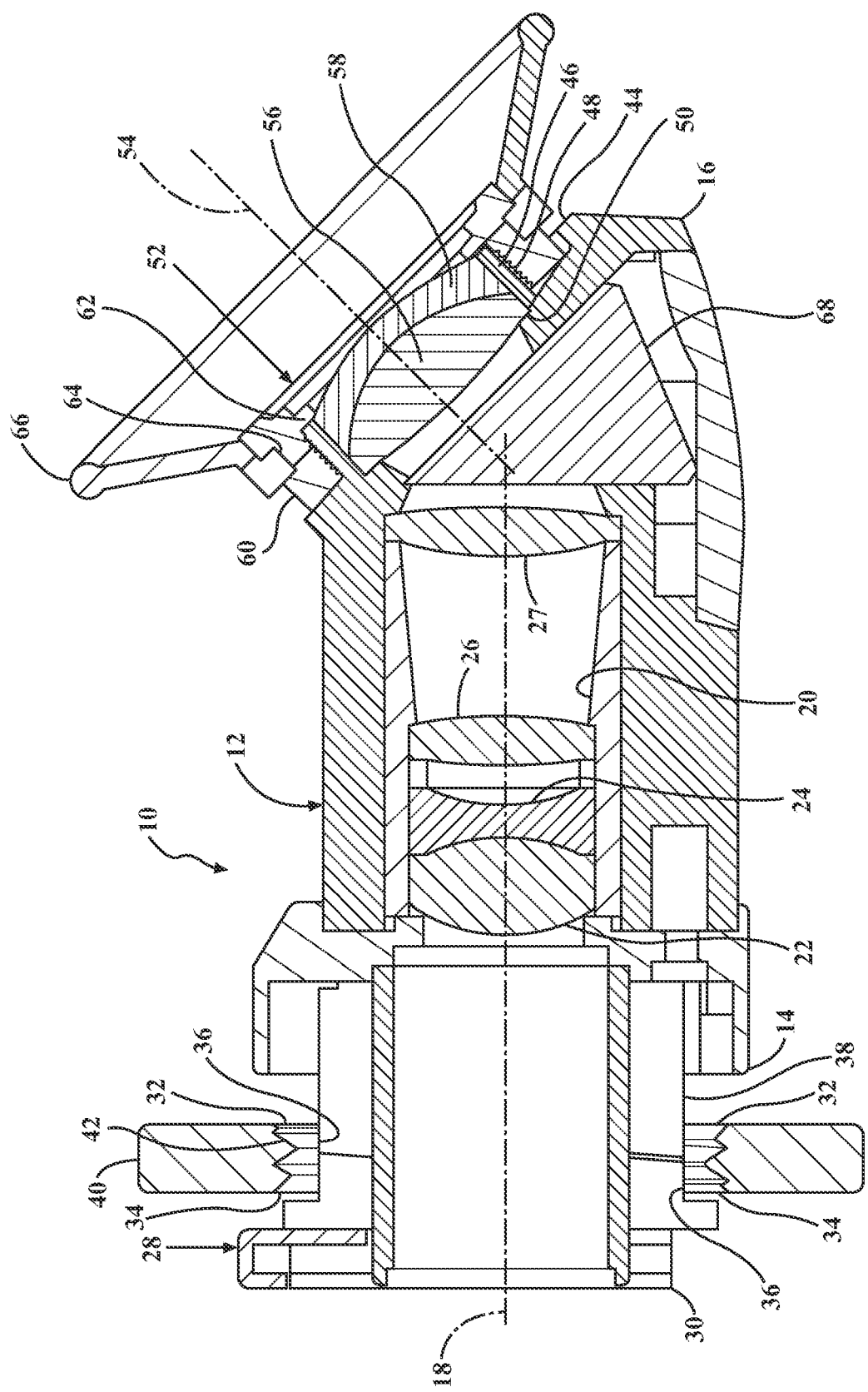
FIG. 3 is a cross-sectional view of the camera viewfinder viewer accessory taken along the line 3-3 in FIG. 2.

With reference to FIGS. 1-3, the viewer accessory 10 includes an elongated body portion 12 having a first end 14, an opposite second end 16, and a longitudinal axis 18 extending from the first end to the second end. A light-transmitting passageway 20 extends through the body portion 12 from the first end 14 to the second end 16. The body portion 12 may house some of the internal components (e.g., optics, mechanics) of the viewer accessory 10. For example, as shown in FIG. 3, a plurality of cooperative objective lenses 22, 24, 26, 27 may be mounted within the light-transmitting passageway 20 of the body portion 12. The longitudinal axis 18 of the body portion 12 is generally perpendicular to the camera viewfinder in a mounted disposition in which the body portion is mounted on the camera (see below). More specifically, the longitudinal axis 18 of the body portion is generally perpendicular to a plane in which the camera viewfinder window lies. Since the camera viewfinder window is typically disposed on the back face of the camera, the longitudinal axis 18 of the body portion 12 is also generally perpendicular to the back face of the camera.

A connector 28 for mounting the body portion 12 to a camera viewfinder of a camera is disposed adjacent to the first end 14. The connector 28 extends outwardly from the body portion first end 14 and may include a mounting feature 30 at a terminal end that allows for mounting of the viewer accessory 10 on a camera viewfinder, such as to a frame of the viewfinder. The connector 28 may be an assembly that is releasably securable to a camera viewfinder. For example, in one embodiment the mounting feature 30 is a generally U-shaped receiver mountable at least in part around a camera viewfinder frame, and the connector 28 also includes thread units 32 that extend from the mounting feature. The thread units are defined by extensions having outside threads 34 and inside geometric surfaces 36. The connector also includes an indexing periphery 38 having a peripheral shape for cooperating with the inside geometric surfaces 36 of the thread units 32. A tightening wheel 40 of the connector 28 has internal threads 42 cooperable with the outside threads 34 of the thread units 32 to tighten the mounting feature 30 to the camera viewfinder frame.

The body portion second end 16 includes an angled face 44 disposed at a generally 45° angle relative to the body portion longitudinal axis 18. An annular mounting ring 46 extends outwardly from the angled face 44 and includes a threaded outer surface 48. A seat 50 is disposed within the annular ring 46 generally at an inner end of the annular ring. An eyepiece 52 is connected to the body portion 12 adjacent the angled face 44 at the body portion second end 16. The eyepiece 52 has a longitudinal axis 54 generally disposed at a 45° angle relative to the longitudinal axis 18 of the body portion 12. The eyepiece 52 includes one or more eyepiece lenses such as eyepiece lens 56 and cooperative eyepiece lens 58. The eyepiece lenses 56, 58 are housed within the annular ring 46 and rest against seat 50. The eyepiece lenses 56, 58 may provide optical magnification of the image viewed through the viewer accessory, and the eyepiece 52 may also include a diopter adjustment mechanism that allows for adjustment of the focus of an image viewed through the viewer accessory. The eyepiece 52 also includes a tubular cap 60 that screws onto the threads 48 of the annular ring 46. The tubular cap includes a circular flange 62 that secures the eyepiece lenses 56, 58 within the annular ring 46, and a recessed outer surface 64 to which an eyecup 66 is mounted. The eyecup 66 generally extends outwardly and away from the body portion 12.

A prism 68 is mounted within the light-transmitting passageway 20 of the body portion 12 to redirect light from the longitudinal axis 18 of the body portion to the eyepiece lenses 56, 58 of the eyepiece 52. A viewfinder image (i.e., an image formed by light passing through the camera viewfinder) is directed from the camera viewfinder to the light-transmitting passageway 20 of the viewer accessory 10 and along the longitudinal axis 18 of the body portion 12. The image is then redirected along the longitudinal axis 54 of the eyepiece 52 by the prism 68, in order to be viewed by a user through the eyepiece 52.

Figure 4:
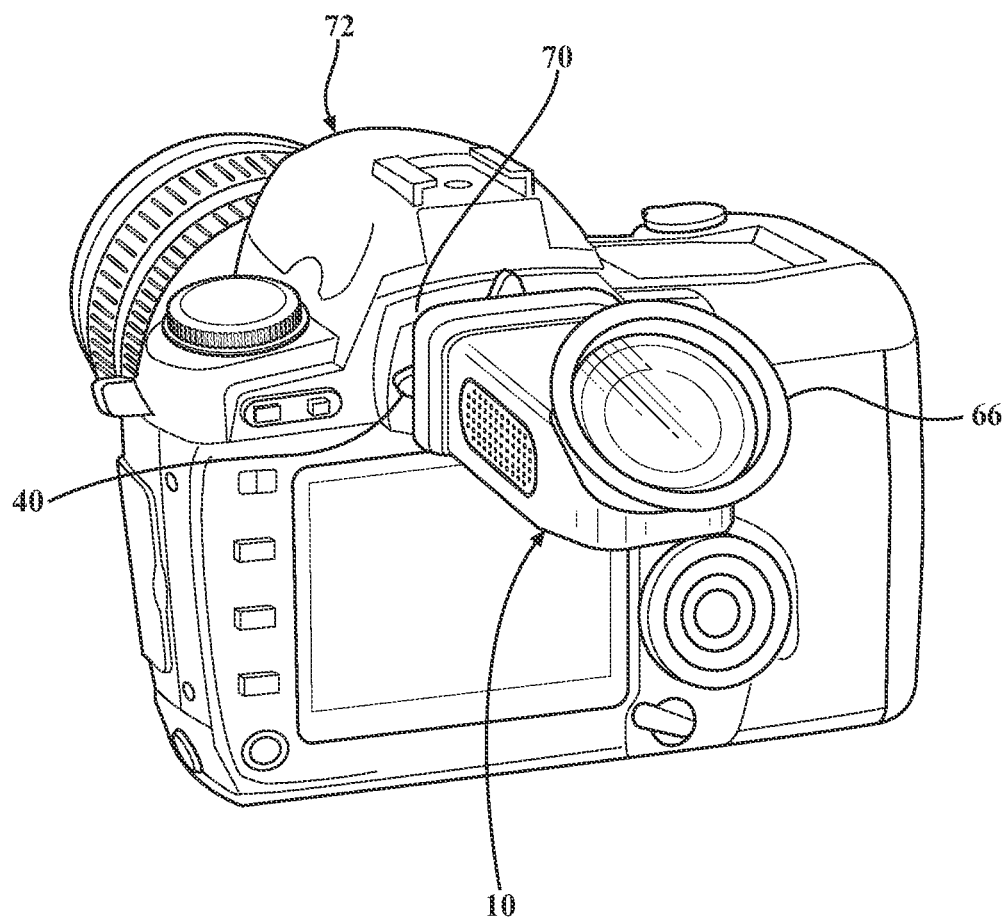
FIG. 4 is an environmental view of the viewer accessory mounted on a viewfinder of a camera.

With reference now to FIGS. 3 and 4, the viewer accessory 10 is shown mounted on a camera viewfinder 70 of a camera 72. The mounting feature 30 of the connector 28 is slid onto the outer frame of the camera viewfinder 70 and secured with the tightening wheel 40. A user such as a photographer may then position the eyecup 66 up to the user's face about one of the user's eyes so that the user may view an image through the viewer accessory 10. The eyecup 66 shields the image viewed through the accessory 10 from ambient light, and the accessory 10 allows the user to compose a picture with the camera viewfinder 70 without having to hold the camera directly against his or her face.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A camera viewfinder viewer accessory mountable on a camera viewfinder, the viewer accessory comprising:
   an elongated body portion having first and second ends and a longitudinal axis extending from said first end to said second end;
   a light-transmitting passageway through said body portion from said first end to said second end;
   a connector for mounting said body portion to the camera viewfinder, said connector being disposed adjacent to said first end of said body portion, and said connector being an assembly that is releasably securable to the camera viewfinder;
   said body portion second end including an angled face disposed at a generally 45° angle relative to said longitudinal axis;
   an eyepiece connected to said body portion adjacent said angled face at said second end of said body portion, said eyepiece having a longitudinal axis generally disposed at an angle that is 45 degrees relative to said longitudinal axis of said body portion;
   wherein a viewfinder image is directed from said camera viewfinder along said longitudinal axis of said body portion, the image is redirected along said longitudinal axis of said eyepiece, to be viewed through said eyepiece.

2. The camera viewfinder viewer accessory of claim 1, including a plurality of cooperative objective lenses mounted within said light-transmitting passageway of said body portion.

3. The camera viewfinder viewer accessory of claim 1, wherein said eyepiece includes at least one eyepiece lens.

4. The camera viewfinder viewer accessory of claim 3, including a prism mounted within said light-transmitting passageway of said body portion to redirect light from said longitudinal axis of said body portion to said at least one eyepiece lens of said eyepiece.

5. The camera viewfinder viewer accessory of claim 3, wherein said at least one eyepiece lens provides optical magnification of the image viewed through the viewer accessory.

6. The camera viewfinder viewer accessory of claim 1, wherein said eyepiece includes an eyecup that extends away from said body portion.

7. The camera viewfinder viewer accessory of claim 1, wherein said eyepiece includes a diopter adjustment.

8. A camera viewfinder viewer accessory mountable on a camera viewfinder, the viewer accessory comprising:
   an elongated body portion having first and second ends and a longitudinal axis extending from said first end to said second end;
   a light-transmitting passageway through said body portion from said first end to said second end;
   a plurality of cooperative objective lenses mounted within said light-transmitting passageway of said body portion;
   a connector for mounting said body portion to the camera viewfinder, said connector being disposed adjacent to said first end;
   said body portion second end including an angled face disposed at a generally 45° angle relative to said longitudinal axis;
   an eyepiece connected to said body portion adjacent said angled face at said second end of said body portion, said eyepiece having a longitudinal axis generally disposed at an angle that is 45 degrees relative to said longitudinal axis of said body portion, and said eyepiece including at least one eyepiece lens;
   a single prism disposed in said light-transmitting passageway between said eyepiece and said plurality of cooperative objective lenses;
   wherein a viewfinder image is directed from said camera viewfinder along said longitudinal axis of said body portion, the image is redirected along said longitudinal axis of said eyepiece, to be viewed through said eyepiece.

9. The camera viewfinder viewer accessory of claim 8, wherein said plurality of cooperative objective lenses are disposed between said prism and said first end of said body portion.

* * * * *